(12) United States Patent
Haenel (10) Patent No.: US 12,402,746 B2
(45) Date of Patent: Sep. 2, 2025

(54) COFFEE BREWING DEVICE AND METHOD OF USE

(71) Applicant: Dara Haenel, Mission Viejo, CA (US)

(72) Inventor: Dara Haenel, Mission Viejo, CA (US)

( * ) Notice: Subject to any disclaimer, the term of this patent is extended or adjusted under 35 U.S.C. 154(b) by 360 days.

(21) Appl. No.: 18/095,602

(22) Filed: Jan. 11, 2023

(65) Prior Publication Data

US 2024/0225343 A1    Jul. 11, 2024

(51) Int. Cl.
*A47J 31/20* (2006.01)
*A23F 5/26* (2006.01)

(52) U.S. Cl.
CPC ................ *A47J 31/20* (2013.01); *A23F 5/26* (2013.01)

(58) Field of Classification Search
CPC .............. A23F 5/26; A47J 31/20; A47J 31/18
See application file for complete search history.

(56) References Cited

U.S. PATENT DOCUMENTS

| | | |
|---|---|---|
| D608,142 S | 1/2010 | Davies |
| 9,192,261 B2 | 11/2015 | Katz |
| 9,661,949 B1 | 5/2017 | Patel |
| 10,820,738 B2 | 11/2020 | Bodum |
| 10,820,739 B2 | 11/2020 | Eisenberg |
| 11,071,406 B2 | 7/2021 | Sptizley |
| 2017/0181567 A1 | 6/2017 | Martija |
| 2020/0015619 A1 | 1/2020 | Chimezie |
| 2021/0298516 A1 * | 9/2021 | Radparvar ............. A47J 31/60 |

FOREIGN PATENT DOCUMENTS

| | | | |
|---|---|---|---|
| WO | WO-2012025125 A2 * | 3/2012 | ............. A47J 31/20 |
| WO | WO2019050941 | 3/2019 | |

* cited by examiner

*Primary Examiner* — Steven W Crabb
*Assistant Examiner* — Dilnessa B Belay (57) ABSTRACT

A coffee brewing device allowing for easy post-brewing cleanup includes a cup, which is positionable in a container to which a lid is attachable to close its top. Hot water and coffee grounds can be added to the container. A handle, which is rotationally attached to an upper end of a tube that is slidably positioned through a hole in the lid, is selectively attachable to the rod, which extends from the cup. The rod is insertable through a filter and into the tube to position the filter adjacent to the lid. A user pushes down on the handle to force the filter through the slurry so that the coffee grounds collect in the cup. The user then attach the handle to the rod to remove the lid, the filter, the cup, and the coffee grounds from the container.

10 Claims, 6 Drawing Sheets

COFFEE BREWING DEVICE AND METHOD OF USE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to brewing devices and more particularly pertains to a new brewing device allowing for easy post-brewing cleanup. The present invention discloses a brewing device having a cup for collection of coffee grounds, thereby allowing the cup and coffee grounds to be removed from the container for facilitating cleanup.

(2) Description of Related Art Including Information Disclosed Under 37 CFR 1.97 and 1.98

The prior art relates to brewing devices, which may comprise containers having detachable bottom sections that collect coffee grounds, cups positionable at bottoms of containers, wherein an upper limit of the cup may engage a filter module upon depression of the filter modules, What is lacking in the prior art is a brewing device having a cup positionable at a bottom of a container that does not couple to a filter module. Rather, the filter module can be pushed down to the upper limit of the cup, or even into the cup, prior to the cup, coffee grounds, and filter module being removed from the container by means of a rod extending through the filter module and a tube to which the filter module is attached.

BRIEF SUMMARY OF THE INVENTION

An embodiment of the disclosure meets the needs presented above by generally comprising a cup, which is circumferentially complementary to and selectively positionable in a container. A rod, which has a lower terminus attached to the cup, extends axially from the cup and protrudes through a top of the container with the cup positioned on a bottom of the container. The container is configured for addition of hot water and coffee grounds. A lid, through which a hole is axially positioned, is selectively attachable to the container to substantially close the top of the container. A handle, which is rotationally attached to an upper end of a tube that is slidably positioned through the hole, is selectively attachable to an upper terminus of the rod. A filter module is attached to a lower end of the tube. The rod is insertable through the filter module and into the tube to position the filter module adjacent to the lid and atop a slurry of the hot water and coffee grounds. A user is positioned to push down on the handle to force the filter module through the slurry so that the coffee grounds collect in the cup. The user then is positioned to attach the handle to the rod and to remove the lid, the filter module, the cup, and the coffee grounds from the container.

Another embodiment of the disclosure includes a method of brewing coffee. The method comprises provision steps, which entail providing a coffee brewing device, according to the disclosure above and providing coffee grounds and hot water. Operational steps of the method are adding the coffee grounds to the cup, positioning the cup on the bottom of the container, adding the hot water to the container, positioning tube over the rod, pushing down on the handle for forcing the filter module through the slurry, attaching the handle to the rod, dispensing the coffee from the container, and extracting the lid, the filter module, the cup, and the coffee grounds from the container.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 6 thereof, a new brewing device embodying the principles and concepts of an embodiment of the disclosure and generally designated by the reference numeral 10 will be described.

As best illustrated in FIGS. 1 through 6, the coffee brewing device 10 generally comprises a cup 12, which is circumferentially complementary to and selectively positionable in a container 14. The container 14 is configured for addition of hot water and coffee grounds. Many configurations for such brewing devices are taught in the prior art and are anticipated by the present invention. Such brewing devices typically are cylindrical, have handles, which are attached or attachable to their containers 14 and which allow for lifting and pouring of liquid contents, and may comprise glass, double-walled stainless steel, or the like.

A rod 16, which has a lower terminus 18 that is attached to the cup 12, extends axially from the cup 12 and protrudes through a top 20 of the container 14 with the cup 12 positioned on a bottom 22 of the container 14. The rod 16 is threaded adjacent to its upper terminus 24 and its lower terminus 18. A coupler 98 is attached to the lower terminus 18 of the rod 16 and is configured to selectively couple to the cup 12 so that the rod 16 is removably attachable to the cup 12.

Figure 1:
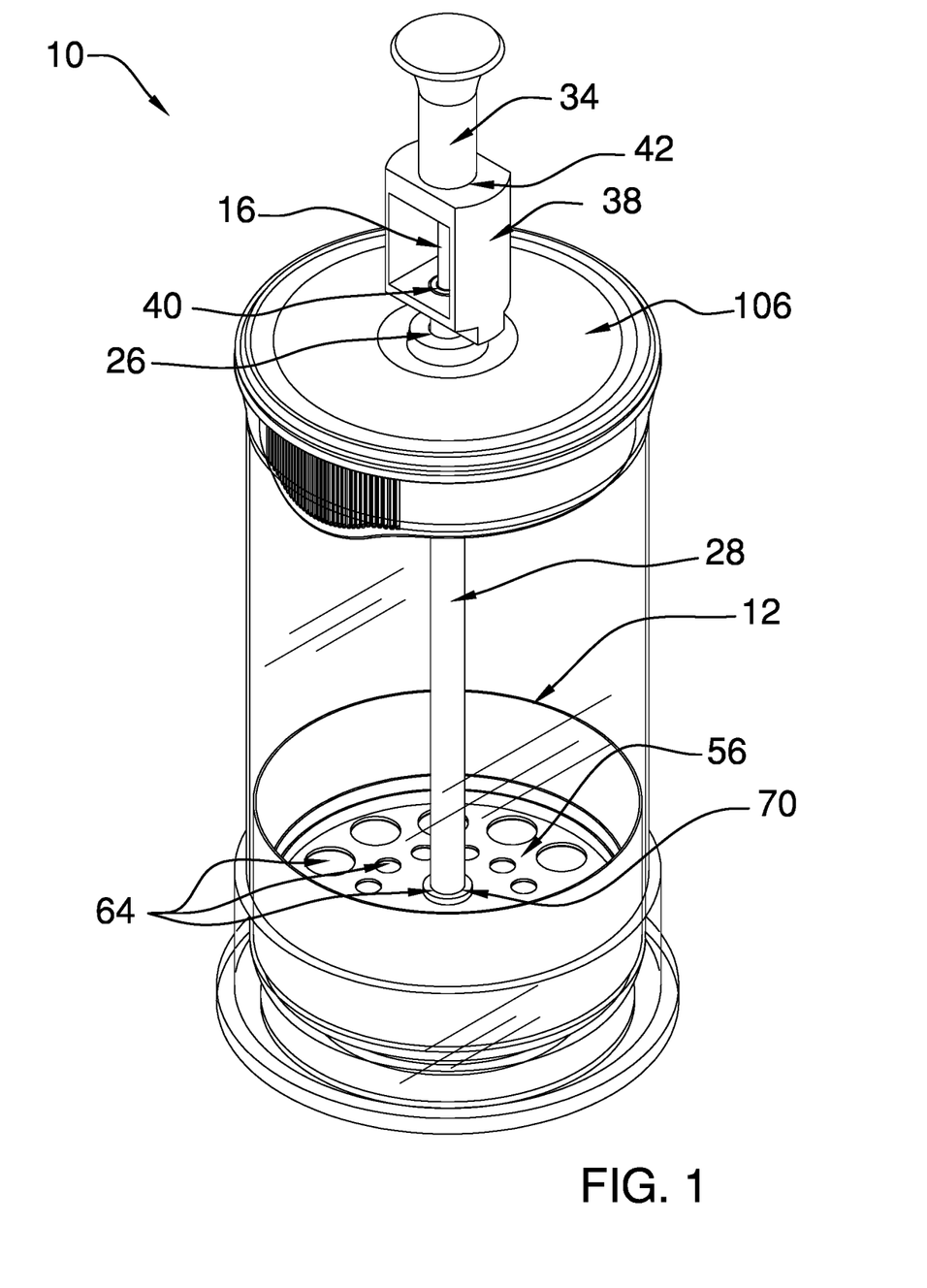
FIG. 1 is an isometric perspective view of a coffee brewing device according to an embodiment of the disclosure.
Figure 2:
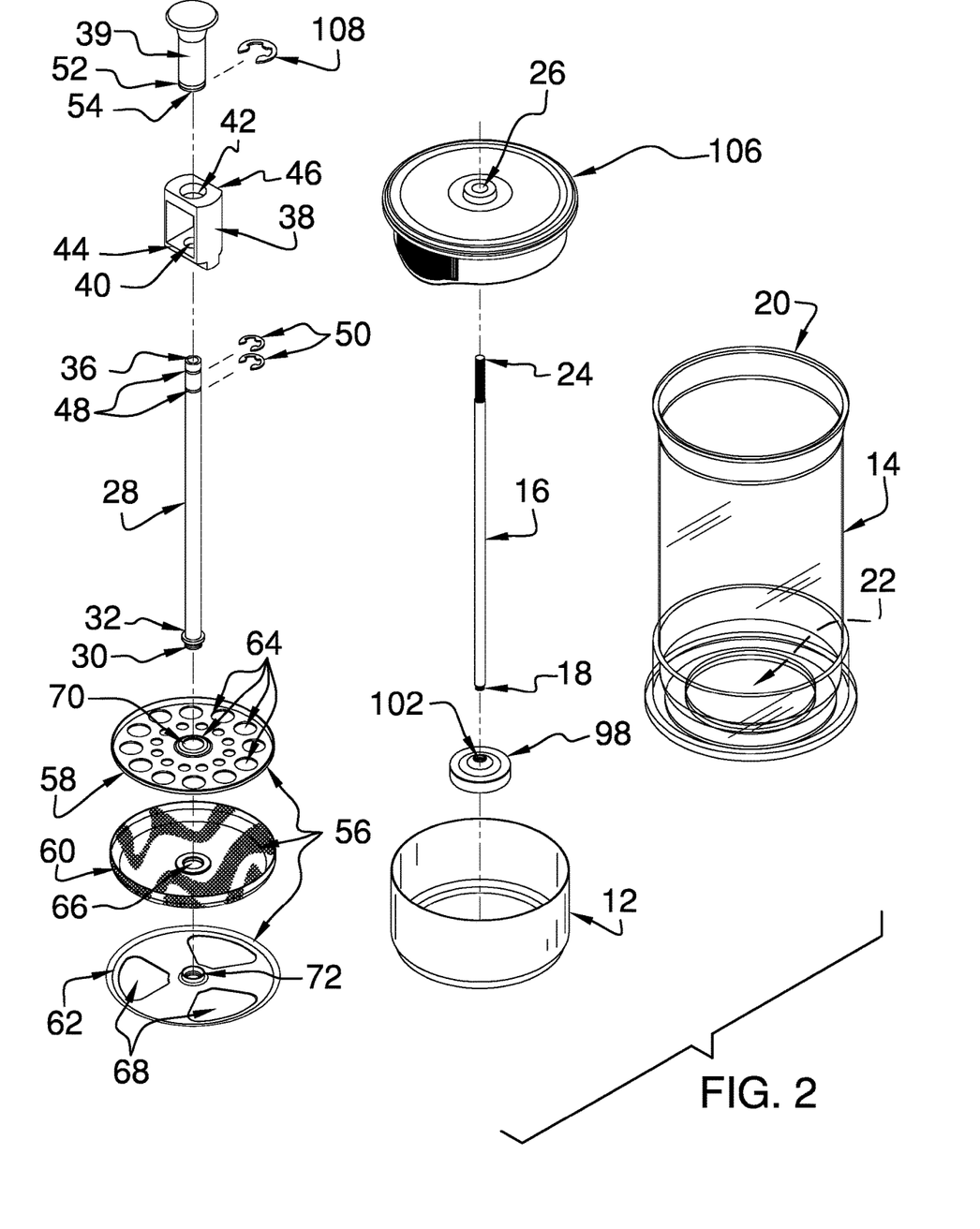
FIG. 2 is an exploded view of an embodiment of the disclosure.
Figure 3:
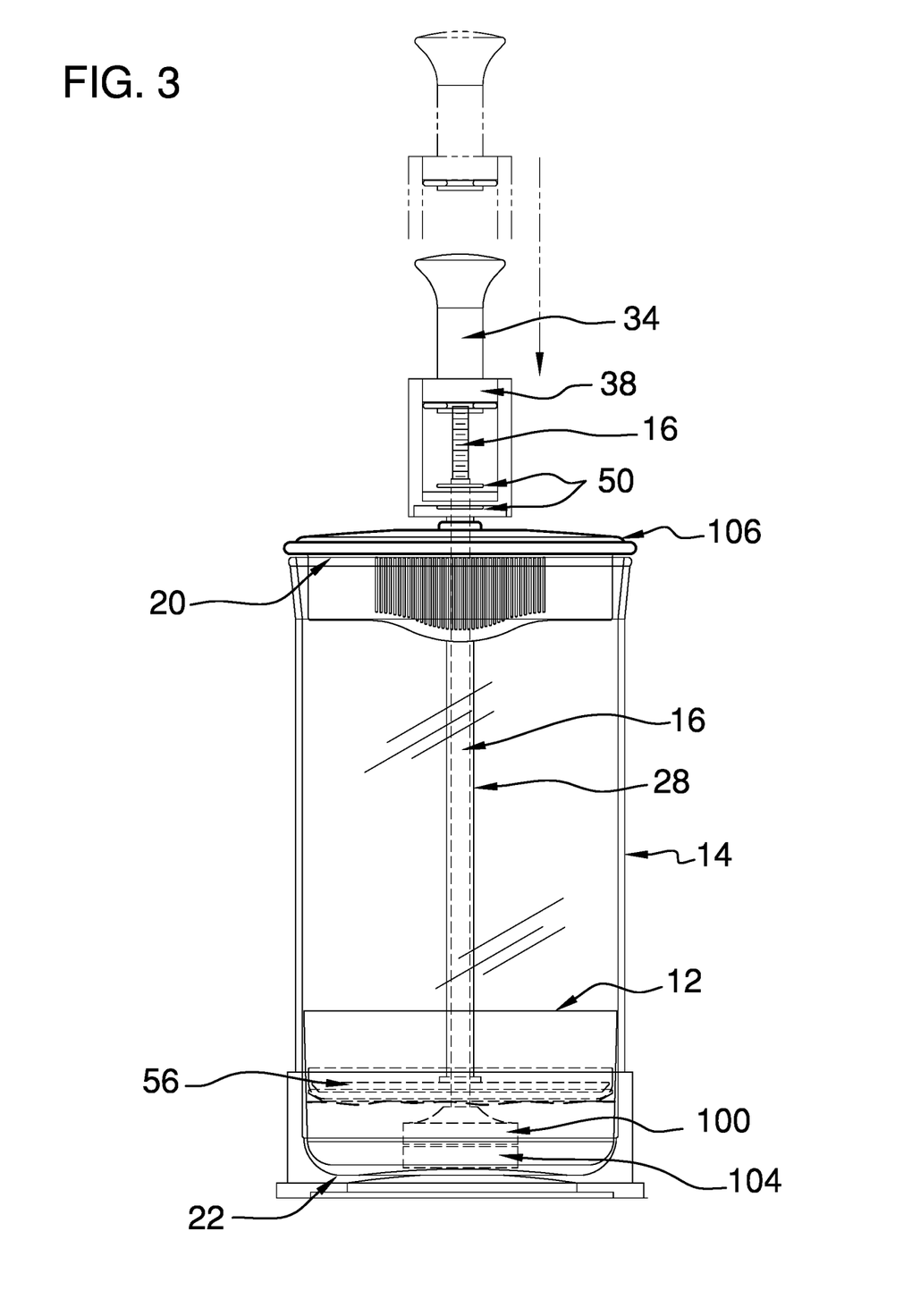
FIG. 3 is a front view of an embodiment of the disclosure.
Figure 5:
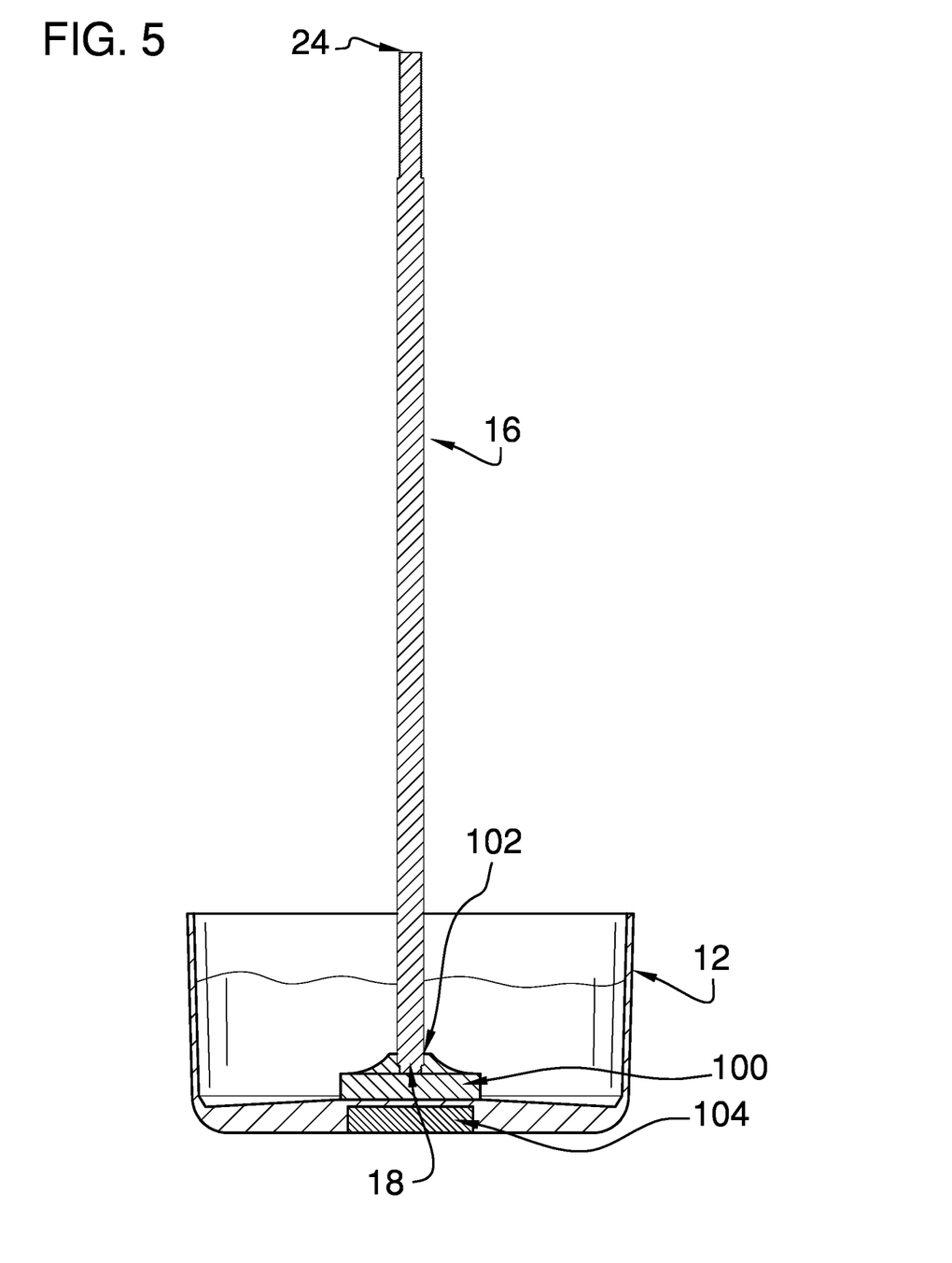
FIG. 5 is a cross-sectional view of an embodiment of the disclosure.

The coupler 98 may comprise a magnet 100, or other coupling means, such as, but not limited to, threaded sockets, hooks, or the like. The magnet 100 can magnetically attach to the cup 12, should the cup 12 comprise paramagnetic metal, such as stainless steel. As shown in FIGS. 2 and 5, a recess 102 is axially positioned in the magnet 100. The recess 102 is internally threaded so that the lower terminus 18 of the rod 16 is selectively threadedly insertable into the recess 102 to removably attach the rod 16 to the magnet 100. The coffee brewing device 10 also may comprise a disc 104, which is attached to and centrally positioned in the cup 12. The disc 104 is magnetized so that the disc 104 is positioned for magnetic attachment to the magnet 100, thereby providing stronger coupling between the rod 16 and the cup 12.

A lid 106, through which a hole 26 is axially positioned, is selectively attachable to the container 14 to substantially close the top 20 of the container 14. A tube 28, which is externally threaded adjacent to its lower end 30, is slidably positioned through the hole 26. A stop ring 32 is attached to and extends circumferentially around the tube 28 proximate to the lower end 30.

A handle 34 is rotationally attached to an upper end 36 of the tube 28. The handle 34 also is selectively attachable to the upper terminus 24 of the rod 16. The handle 34 may be tubular and internally threaded so that the upper terminus 24 of the rod 16 is selectively threadedly insertable into the handle 34 to removably attach the handle 34 to the rod 16. Other reversible attachment means for attaching the handle 34 to the rod 16 also are anticipated, such as, but not limited to, friction coupling, spring-loaded pins, or the like.

As shown in FIGS. 2-5, the coffee brewing device 10 also comprises a frame 38, which is substantially rectangular. A first circular cutout 40 and a second circular cutout 42 are positioned in a lower member 44 and an upper member 46 of the frame 38, respectively. A pair of first indents 48 extends into and circumferentially around the tube 28 proximate to the upper end 36. The tube 28 is insertable into the first circular cutout 40 so that each first clip 50 of a pair of first clips 50 is selectively insertable into a respective first indent 48 to removably attach the tube 28 to the frame 38. A second indent 52 extends into and circumferentially around the handle 34 proximate to a lower limit 54 of the handle 34. The handle 34 is selectively slidably positionable in the second circular cutout 42 so that a second clip 108 is selectively insertable into the second indent 52 to slidably attach the handle 34 to the frame 38.

A filter module 56 is attached to the lower end 30 of the tube 28. The rod 16 is insertable through the filter module 56 and into the tube 28 to position the filter module 56 adjacent to the lid 106 and atop a slurry of the hot water and coffee grounds in the container 12. A user is positioned to push down on the handle 34 to force the filter module 56 through the slurry so that the coffee grounds collect in the cup 12. The user then is positioned to attach the handle 34 to the rod 16 and to remove the lid 106, the filter module 56, the cup 12, and the coffee grounds from the container 14, which significantly simplifies post-brewing cleanup relative to prior art brewing devices. The coffee brewing device 10 can be used to make coffee, tea, hot chocolate, cold brews, fruit infusions, herbal drinks, and the like.

Figure 4:
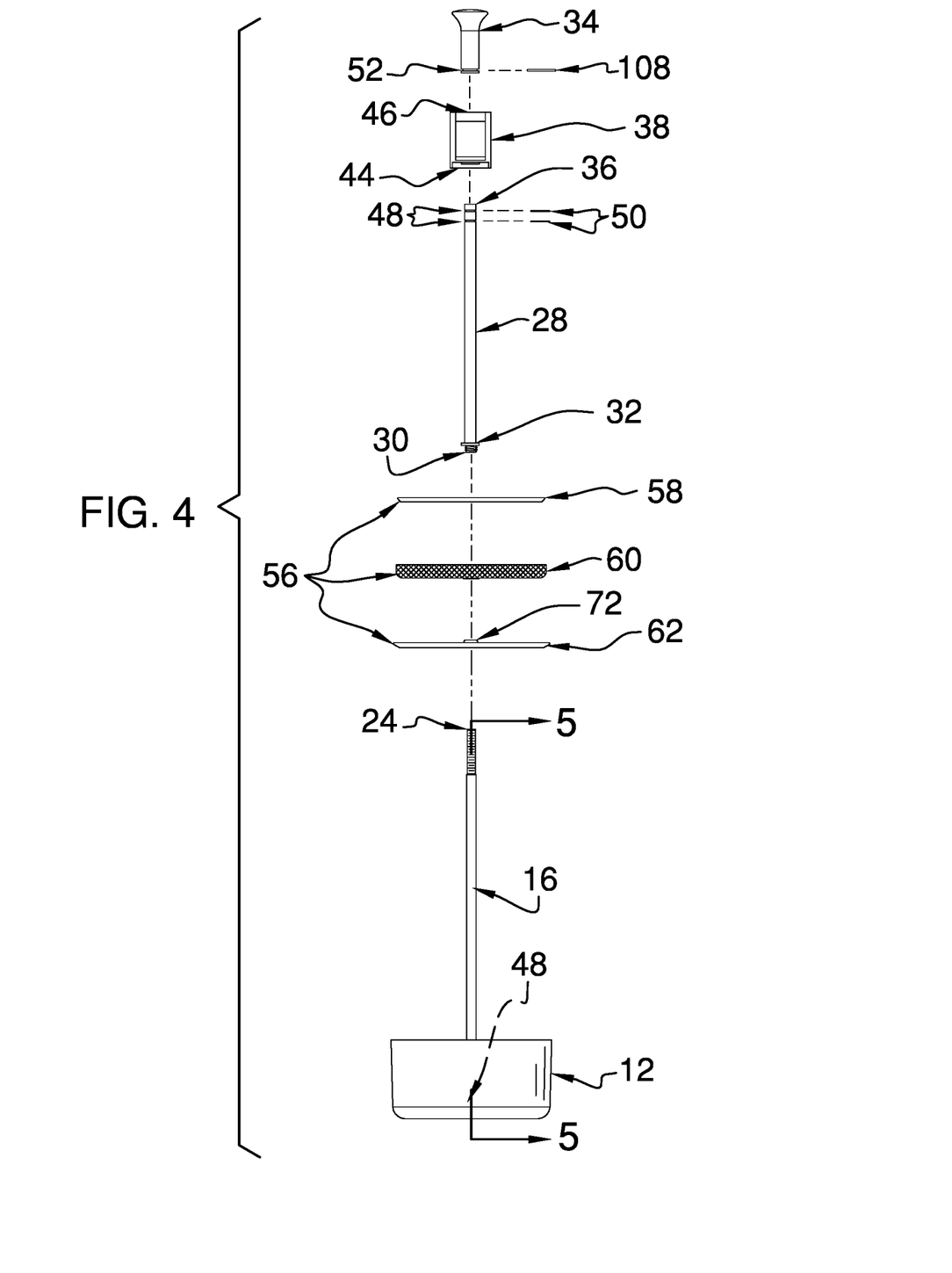
FIG. 4 is an exploded view of an embodiment of the disclosure.

The prior art teaches many configurations of filter modules 56 for such brewing devices and these are anticipated by the present invention. One example of a filter module 56 comprises an upper disc 58, a filter disc 60, and a lower disc 62, as shown in FIGS. 2 and 4. A plurality of first orifices 64, a second orifice 66, and a plurality of third orifices 68 are positioned in the upper disc 58, the filter disc 60, and the lower disc 62, respectively. A central one 70 of the plurality of first orifices 64 is complementary to the tube 28 so that the lower end 30 of the tube 28 is insertable into the central one 70 of the first orifices 64 to abut the upper disc 58 to the stop ring 32. The second orifice 66 is centrally positioned in the filter disc 60 so that the lower end 30 of the tube 28 is insertable into the second orifice 66 to abut the filter to the upper disc 58. A coupling ring 72, which is internally threaded, is attached to the lower disc 62 so that the lower end 30 of the tube 28 is threadedly insertable into the coupling ring 72 to removably attach the filter module 56 to the tube 28.

Figure 6:
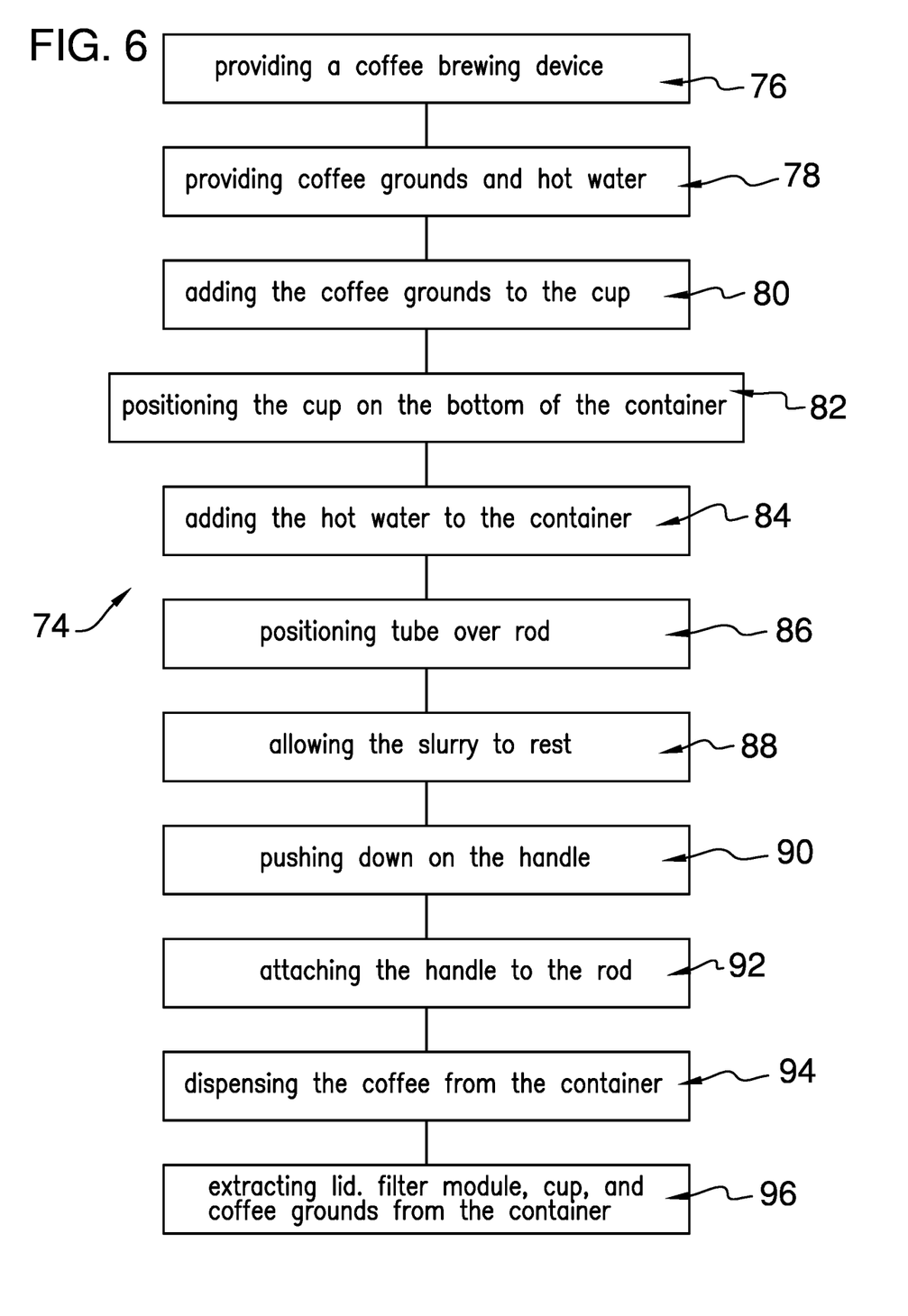
FIG. 6 is a flow diagram for a method utilizing an embodiment of the disclosure.

In use, the coffee brewing device 10 enables a method of brewing coffee 74, which comprises a first provision step 76 that entails providing a coffee brewing device 10, according to the specification above. A second provision step 78 of the method 74 is providing coffee grounds and hot water. A first operational step 80 of the method 74 is adding the coffee grounds to the cup 12. A second operational step 82 of the method 74 is positioning the cup 12 on the bottom 22 of the container 14. A third operational step 84 of the method 74 is adding the hot water to the container 14 to generate a slurry of the hot water and coffee grounds. A fourth operational step 86 of the method 74 is positioning tube 28 over the rod 16, such the filter module 56 is positioned atop the slurry and such that the lid 106 substantially closes the top 20 of the container 14.

A fifth operational step 88 of the method 74 is allowing the slurry to rest. A sixth operational step 90 of the method 74 is pushing down on the handle 34 to force the filter module 56 through the slurry. A seventh operational step 92 of the method 74 is attaching the handle 34 to the rod 16. An eighth operational step 94 of the method 74 is dispensing the coffee from the container 14. A ninth operational step 96 of the method 74 is extracting the lid 106, the filter module 56, the cup 12, and the coffee grounds from the container 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A coffee brewing device comprising:
   a container;
   a cup circumferentially complementary to the container, such that the cup is selectively positionable in the container to rest upon a bottom of the container, wherein the container is configured for addition of hot water and coffee grounds;
   a rod having a lower terminus attached to the cup, such that the rod extends axially from the cup and protrudes through a top of the container with the cup positioned on the bottom of the container;
   a lid selectively attachable to the container for substantially closing the top of the container;
   a hole axially positioned through the lid;
   a tube slidably positioned through the hole;
   a handle rotationally attached to an upper end of the tube, the handle being selectively attachable to an upper terminus of the rod; and
   a filter module attached to a lower end of the tube, such that the rod is insertable through the filter module into the tube for positioning the filter module adjacent to the lid and atop a slurry of the hot water and coffee grounds, positioning a user for pushing down on the handle for forcing the filter module through the slurry, such that the coffee grounds collect in the cup, positioning the user for attaching the handle to the rod and for removing the lid, the filter module, the cup, and the coffee grounds from the container.

2. The coffee brewing device of claim 1, further including a coupler attached to the lower terminus of the rod and being configured for selectively coupling to the cup, such that the rod is removably attachable to the cup.

3. The coffee brewing device of claim 2, wherein the coupler comprises a magnet.

4. The coffee brewing device of claim 3, further including:
   the rod being threaded adjacent to the lower terminus of the rod; and
   a recess axially positioned in the magnet, the recess being internally threaded, such that the lower terminus of the rod is selectively threadedly insertable into the recess for removably attaching the rod to the magnet.

5. The coffee brewing device of claim 3, further including a disc attached to and centrally positioned in the cup, the disc being magnetized, such that the disc is positioned for magnetic attachment to the magnet.

6. The coffee brewing device of claim 1, wherein:
   the rod is threaded adjacent to the upper terminus of the rod; and
   the handle is tubular and internally threaded, such that the upper terminus of the rod is selectively threadedly insertable into the handle for removably attaching the handle to the rod.

7. The coffee brewing device of claim 1, further including:
   a frame, the frame being substantially rectangular;
   a first circular cutout positioned in a lower member of the frame;
   a pair of first indents extending into and circumferentially around the tube proximate to the upper end, such that the tube is insertable into the first circular cutout;
   a pair of first clips, each first clip of the pair of first clips being selectively insertable into a respective first indent of the pair of first indents for removably attaching the tube to the frame;
   a second circular cutout positioned in an upper member of the frame, such that the handle is selectively slidably positionable in the second circular cutout;
   a second indent extending into and circumferentially around the handle proximate to a lower limit of the handle; and
   a second clip selectively insertable into the second indent for slidably attaching the handle to the frame.

8. The coffee brewing device of claim 1, further including:
   the tube being externally threaded adjacent to a lower end of the tube;
   a stop ring attached to and extending circumferentially around the tube proximate to the lower end; and
   the filter module comprising:
      an upper disc,
      a plurality of first orifices positioned in the upper disc, a central one of the plurality of first orifices being complementary to the tube, such that the lower end of the tube is insertable into the central one of the plurality of first orifices to abut the upper disc to the stop ring,
      a filter disc,
      a second orifice centrally positioned in the filter disc, such that the lower end of the tube is insertable into the second orifice to abut the filter disc to the upper disc,
      a lower disc,
      a plurality of third orifices positioned in the lower disc, and
      a coupling ring attached to the lower disc, the coupling ring being internally threaded, such that the lower end of the tube is threadedly insertable into the coupling ring for removably attaching the filter module to the tube.

9. A coffee brewing device comprising:
   a container;
   a cup circumferentially complementary to the container, such that the cup is selectively positionable in the container to rest upon a bottom of the container, wherein the container is configured for addition of hot water and coffee grounds;
   a rod having a lower terminus attached to the cup, such that the rod extends axially from the cup and protrudes through a top of the container with the cup positioned on the bottom of the container, the rod being threaded adjacent to an upper terminus and the lower terminus of the rod;
   a coupler attached to the lower terminus of the rod and being configured for selectively coupling to the cup, such that the rod is removably attachable to the cup, the coupler comprising a magnet;

a recess axially positioned in the magnet, the recess being internally threaded, such that the lower terminus of the rod is selectively threadedly insertable into the recess for removably attaching the rod to the magnet;
a disc attached to and centrally positioned in the cup, the disc being magnetized, such that the disc is positioned for magnetic attachment to the magnet;
a lid selectively attachable to the container for substantially closing the top of the container;
a hole axially positioned through the lid;
a tube slidably positioned through the hole, the tube being externally threaded adjacent to a lower end of the tube;
a stop ring attached to and extending circumferentially around the tube proximate to the lower end;
a handle rotationally attached to an upper end of the tube, the handle being selectively attachable to the upper terminus of the rod, the handle being tubular and internally threaded, such that the upper terminus of the rod is selectively threadedly insertable into the handle for removably attaching the handle to the rod;
a frame, the frame being substantially rectangular;
a first circular cutout positioned in a lower member of the frame;
a pair of first indents extending into and circumferentially around the tube proximate to the upper end, such that the tube is insertable into the first circular cutout;
a pair of first clips, each first clip of the pair of first clips being selectively insertable into a respective first indent of the pair of first indents for removably attaching the tube to the frame;
a second circular cutout positioned in an upper member of the frame, such that the handle is selectively slidably positionable in the second circular cutout;
a second indent extending into and circumferentially around the handle proximate to a lower limit of the handle;
a second clip selectively insertable into the second indent for slidably attaching the handle to the frame; and
a filter module attached to a lower end of the tube, such that the rod is insertable through the filter module into the tube for positioning the filter module adjacent to the lid and atop a slurry of the hot water and coffee grounds, positioning a user for pushing down on the handle for forcing the filter module through the slurry, such that the coffee grounds collect in the cup, positioning the user for attaching the handle to the rod and for removing the lid, the filter module, the cup, and the coffee grounds from the container, the filter module comprising:
an upper disc,
a plurality of first orifices positioned in the upper disc, a central one of the plurality of first orifices being complementary to the tube, such that the lower end of the tube is insertable into the central one of the plurality of first orifices to abut the upper disc to the stop ring,
a filter disc,
a second orifice centrally positioned in the filter disc, such that the lower end of the tube is insertable into the second orifice to abut the filter disc to the upper disc,
a lower disc,
a plurality of third orifices positioned in the lower disc, and
a coupling ring attached to the lower disc, the coupling ring being internally threaded, such that the lower end of the tube is threadedly insertable into the coupling ring for removably attaching the filter module to the tube.

10. A method of brewing coffee comprising the steps of:
providing a coffee brewing device comprising:
a container,
a cup circumferentially complementary to the container, such that the cup is selectively positionable in the container to rest upon a bottom of the container,
a rod having a lower terminus attached to the cup, such that the rod extends axially from the cup and protrudes through a top of the container with the cup positioned on the bottom of the container,
a lid selectively attachable to the container for substantially closing the top of the container,
a hole axially positioned through the lid,
a tube slidably positioned through the hole,
a handle rotationally attached to an upper end of the tube, the handle being selectively attachable to an upper terminus of the rod, and
a filter module attached to a lower end of the tube, such that the rod is insertable through the filter module into the tube for positioning the filter module adjacent to the lid atop the container;
providing coffee grounds and hot water;
adding the coffee grounds to the cup;
positioning the cup on the bottom of the container;
adding the hot water to the container to generate a slurry of the hot water and coffee grounds;
positioning tube over the rod, such that the filter module is positioned atop the slurry and such that the lid substantially closes the top of the container;
allowing the slurry to rest;
pushing down on the handle for forcing the filter module through the slurry;
attaching the handle to the rod;
dispensing the coffee from the container; and
extracting the lid, the filter module, the cup, and the coffee grounds from the container.

* * * * *